(No Model.)
C. W. AMENT.
THILL COUPLING.
No. 296,103. Patented Apr. 1, 1884.
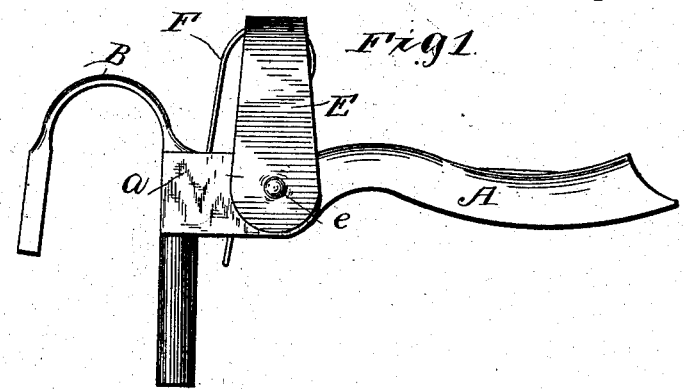
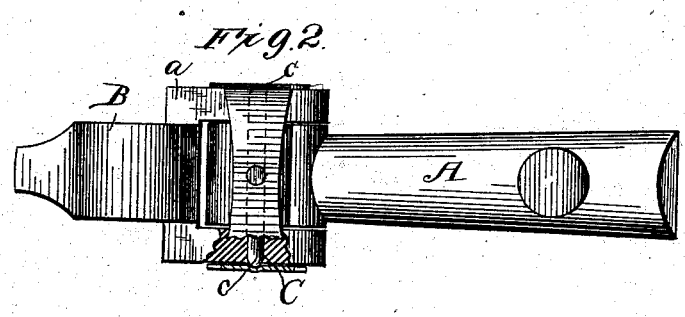
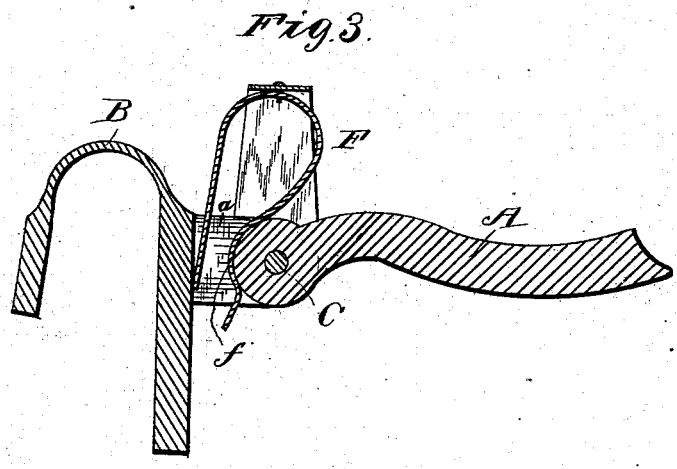
WITNESSES
W. E. Bowen
Wm. M. Rheem
INVENTOR
Cyrus W. Ament
By Myers & Co.
Attorneys.

UNITED STATES PATENT OFFICE.

CYRUS W. AMENT, OF ANTHONY, KANSAS.

THILL-COUPLING.

SPECIFICATION forming part of Letters Patent No. 296,103, dated April 1, 1884.

Application filed January 3, 1884. (No model.)

*To all whom it may concern:*

Be it known that I, C. W. AMENT, a citizen of the United States of America, residing at Anthony, in the county of Harper and State of Kansas, have invented certain new and useful Improvements in Thill-Couplings, of which the following is a specification, reference being had therein to the accompanying drawings.

This invention pertains to improvements in thill-couplings for vehicles, having for its object to obviate rattling; and the invention consists of a bail or an approximately U-shaped spring-metal guard, with indentations or apertures in its ends to receive the tapered or teat-shaped ends of a headless thill pin or bolt; and it also consists of the combination, with the aforesaid parts, of a looped spring about centrally riveted or fastened to said guard upon the under side of the horizontal or cross part of the latter, said spring being adapted to hold the thill bolt or pin firmly in the cheeks of the thill-sockets, substantially as hereinafter fully set forth, and pointed out in the claim.

In the accompanying drawings, Figure 1 is a side view of my improved thill-coupling. Fig. 2 is a plan view. Fig. 3 is a sectional elevation thereof, and Fig. 4 is a view of the pin.

In the organization of my invention I connect the ordinary thill-iron, A, with the thill attached to the usual thill-socket, $a$, of the axle-clip B by means of a headless pin or bolt, C, with tapered or teat-shaped ends $c$.

In connection with the teat-ended thill bolt or pin C, I employ a bail or approximately U-shaped spring-metal guard, E, with its ends provided with apertures or indentations $e\ e$, to receive the ends of the headless bolt C, projecting slightly beyond the thill-socket of the axle-clip B, and to secure said bolt or pin in position as against endwise displacement, the spring-pressure of the guard holding it to its place upon the bolt or pin.

Riveted or fastened to the guard E, upon the under side of the latter, is a looped spring, F, being connected about centrally of its loop to the guard. The ends of the loop are passed into the thill-socket $a$ of the axle-clip B, one end being adapted to bear against the rear side of the thill-socket, while the other end is so curved, as at $f$, as to hug the rear curved portion of the thill-eye, and to tightly hold said eye upon its bolt or pin, thus preventing rattling.

If desired, the guard and spring, it is obvious, can be applied from the under side.

Having thus fully described my invention, I claim and desire to secure by Letters Patent—

A thill-coupling consisting of the headless thill bolt or pin C, with tapered ends $c$, bail or approximately U-shaped spring-metal guard E, having apertures or indentations $e$, to receive the ends of the headless bolt C, and looped spring F, arranged between axle-clip B and thill-iron A, and connected to guard E, substantially as shown, and for the purpose described.

In testimony whereof I affix my signature in presence of two witnesses.

CYRUS W. AMENT.

Witnesses:
M. W. HALSEY,
E. E. ANDREWS.